United States Patent [19]

Sakakibara et al.

[11] Patent Number: 5,057,061
[45] Date of Patent: Oct. 15, 1991

[54] CONTINUOUSLY VARIABLE SPEED TRANSMISSION

[75] Inventors: Shiro Sakakibara; Masahiro Hasebe; Masashi Hattori; Akihiro Kuroyanagi, all of Aichi, Japan

[73] Assignee: Aisin AW Kabushiki Kaisha, Japan

[21] Appl. No.: 451,983

[22] Filed: Dec. 18, 1989

[30] Foreign Application Priority Data

Dec. 30, 1988 [JP] Japan .................. 63-331246

[51] Int. Cl.$^5$ .................. F16H 37/08; F16H 47/06
[52] U.S. Cl. .................. 475/210
[58] Field of Search .......... 475/208, 210, 320, 321, 475/322, 149, 154; 192/3.31, 94, 18 R; 474/29

[56] References Cited

U.S. PATENT DOCUMENTS

| | | | |
|---|---|---|---|
| 3,235,045 | 2/1966 | Pop | 192/94 X |
| 4,063,623 | 12/1977 | Ivey et al. | 192/3.31 |
| 4,467,670 | 8/1984 | Kawamoto | 475/210 X |
| 4,543,852 | 10/1985 | Svab et al. | 475/210 |
| 4,549,447 | 10/1985 | Sakakibara | 74/689 |
| 4,633,736 | 1/1987 | Sakakibara et al. | 475/210 X |
| 4,660,692 | 4/1987 | Sakakibara et al. | 192/3.31 X |
| 4,673,071 | 6/1987 | Moroto et al. | 192/3.31 |
| 4,733,761 | 3/1988 | Sakakibara | 192/3.31 |
| 4,735,598 | 4/1988 | Moroto et al. | 474/29 |
| 4,765,200 | 8/1988 | Koshino | 192/3.31 |
| 4,843,908 | 7/1989 | Koshimo | 192/3.31 |
| 4,895,236 | 1/1990 | Sakakibara et al. | 192/94 |

FOREIGN PATENT DOCUMENTS

| | | | |
|---|---|---|---|
| 77961 | 5/1983 | Japan | 475/210 |
| 196463 | 10/1985 | Japan | 475/210 |

*Primary Examiner*—Dwight Diehl
*Attorney, Agent, or Firm*—Lorusso & Loud

[57] ABSTRACT

A continuously variable speed transmission having a belt drive continuously variable speed transmission in which a belt is wrapped around primary and secondary pulleys each supported on a shaft and each consisting of a pair of sheaves capable of relatively moving axially, and a forward/reverse rotation changeover mechanism. The belt drive continuously variable speed transmission is provided with a pressure adjusting cam mechanism for applying an axial force corresponding to a transmitted torque to at least one of the pulleys, ball screw mechanisms for axially moving the movable sheaves of the pulleys. A fluid torque converter is disposed on the transmission upstream side of the primary pulley. In the belt drive continuously variable speed transmission, the pressure adjusting cam mechanism produces and axial force corresponding to the transmitted torque to clamp the belt, and the power is transmitted by the effect of this clamping force without belt slip. If at the time of vehicle starting the torque of the fluid torque converter is increased, the pressure adjusting cam mechanism produces a larger axial force corresponding to the increased torque, thereby clamping the belt by a larger force to prevent the belt from slipping during transmission of power. This large belt clamping force is produced for only a short time for vehicle starting. As the torque of the fluid torque converter is reduced to a coupling range, the axial force produced by the pressure adjusting cam mechanism is correspondingly reduced automatically. The belt is clamped by a reduced axial force for a greater part of the operating time.

7 Claims, 4 Drawing Sheets

CONTINUOUSLY VARIABLE SPEED TRANSMISSION

BACKGROUND OF THE INVENTION

This invention relates to a continuously variable speed transmission (CVT) based on a belt drive a having a primary and secondary pulleys each consisting of movable and stationary sheaves and a belt or chain made of a metal or the like wrapped around the pulleys and, more particularly, to a continuously variable speed transmission of this type suitable for use in vehicles. More specifically, this invention relates to a continuously variable speed transmission based on the combination of a belt drive continuously variable speed transmission and a fluid torque converter.

Recently, because of demands for improvements in fuel efficiency, continuously variable speed automatic transmission systems incorporating a belt drive continuously variable speed transmission have attracted attention as transmissions for use in motor vehicles.

The applicant of the present invention had invented an automatic transmission based on the combination of a belt drive continuously variable speed transmission, a fluid torque converter and a forward/reverse rotation changeover mechanism. An example of this transmission is disclosed in Japanese Laid-Open Official Gazette for Patent Application No. 57-129953 (U.S. Pat. No. 4,549,447).

In this continuously variable speed transmission, the movable sheave of each of the primary and secondary pulleys of the belt drive continuously variable speed transmission is operated by a hydraulic actuator, and it is necessary for this hydraulic actuator to constantly apply a predetermined axial force to the pulley in order to maintain a belt clamping force corresponding to a predetermined load torque. The forward/reverse rotation changeover mechanism is used to operate a forward clutch and a reverse brake by means of hydraulic actuators.

The applicant of the present invention had also invented a belt drive continuously variable speed transmission in which axial forces corresponding to transmitted torques are applied to pulleys by means of pressure adjusting cam mechanisms and the effective diameter of each pulley is adjusted by a ball screw mechanism. Examples of this transmission are disclosed in Japanese Laid-Open Official Gazette for Patent Application Nos. 62-159848 and 63-158353.

On the other hand, the fluid torque converter operates in a converter range at the time of starting the vehicle to transmit a torque approximately doubled, thereby ensuring a large load torque necessary at the time of vehicle starting. As the vehicle speed is increased, the fluid torque converter starts operating in a coupling range to transmit a torque substantially equal to that of the engine output shaft. In the continuously variable speed transmission based on the combination of the fluid torque converter and the belt drive continuously variable speed transmission, the torque increased by the fluid torque converter acts on the input shaft of the belt drive continuously variable speed transmission, and it is therefore necessary to increase the transmitted torque capacity of this transmission according to the input torque.

To achieve this, it is necessary to increase the piston area of the hydraulic actuator or to increase the operating hydraulic pressure to increase the axial force produced by the hydraulic actuator. However, the increase in the piston size results in an increase in the overall size of the transmission, which is undesirable in consideration of the intended use in a vehicle. If the operating hydraulic pressure is increased, oil leaks from seals and so on become considerable, resulting in an increase in pump loss and, hence, a reduction in the transmission efficiency as well as deterioration in terms of reliability.

Specifically, the fluid torque converter operates in the converter range for only a short period of time at the time of starting of the vehicle, and it operates in the coupling range for a greater part of the vehicle running time without any substantial increase in the torque. It is disadvantageous to set the transmission torque capacity of the continuously variable speed transmission for the increase in the torque for a short time at the time of vehicle starting, because this setting reduces the total efficiency of the transmission, which result is due to limitations with respect to the strength of the mechanisms, the reliability and the transmission efficiency. A problem of a reduction in the life of the belt is also encountered because a large clamping force is always applied to the belt during operation.

Since as described above the period of time for increasing the torque with the fluid torque converter is short, a method may be adopted in which a line pressure is controlled to increase, in the converter range alone, the operating hydraulic pressure supplied to the hydraulic actuator, or a method of providing a bypass conduction passage functioning in the converter range alone may be adopted. However, it is extremely difficult to control the line pressure or the conduction passage in accordance with the operation of the fluid torque converter which automatically increases the speed from the maximum stall state according to the load torque. To achieve this control, the overall system may be complicated. It is also extremely difficult to suitably control such a factor according to every load torque condition, and there is a possibility of the driver feeling awkward in driving. In a case where the line pressure is controlled, the hydraulic pressure may be set to a higher level in consideration of safety rather than the response to avoid occurrence of slips due to variations in the operating manner. For this reason, the problems relating to the belt durability and the total efficiency have not previously been solved.

SUMMARY OF THE INVENTION

It is an object of the present invention to provide a continuously variable speed transmission designed to obtain transmission torque characteristics almost perfectly ideal by using a fluid torque converter, to obtain the desired belt clamping force by use of a pressure adjusting cam mechanism and by increasing the produced axial force as the torque output from the fluid torque converter increases, to reduce the overall size of the transmission, and to improve the transmission efficiency, reliability and belt durability.

To achieve the foregoing objects, the present invention provides a continuously variable speed transmission having: a belt drive continuously variable speed transmission having primary and secondary pulleys each supported on a shaft and each consisting of a pair of fixed and movable sheaves the movable sheaves being capable of moving axially relative to its paired fixed sheave, and a belt wrapped around the primary and secondary pulleys; a fluid torque converter disposed on the transmission upstream side of the primary pulley and a forward/reverse rotation changeover mechanism. The belt drive continuously variable speed transmission includes a pressure adjusting cam mechanism for applying an axial force corresponding to a transmitted torque to at least one of the pulleys, and mechanical actuators for axially moving the movable sheaves of the pulleys.

Figure 1:
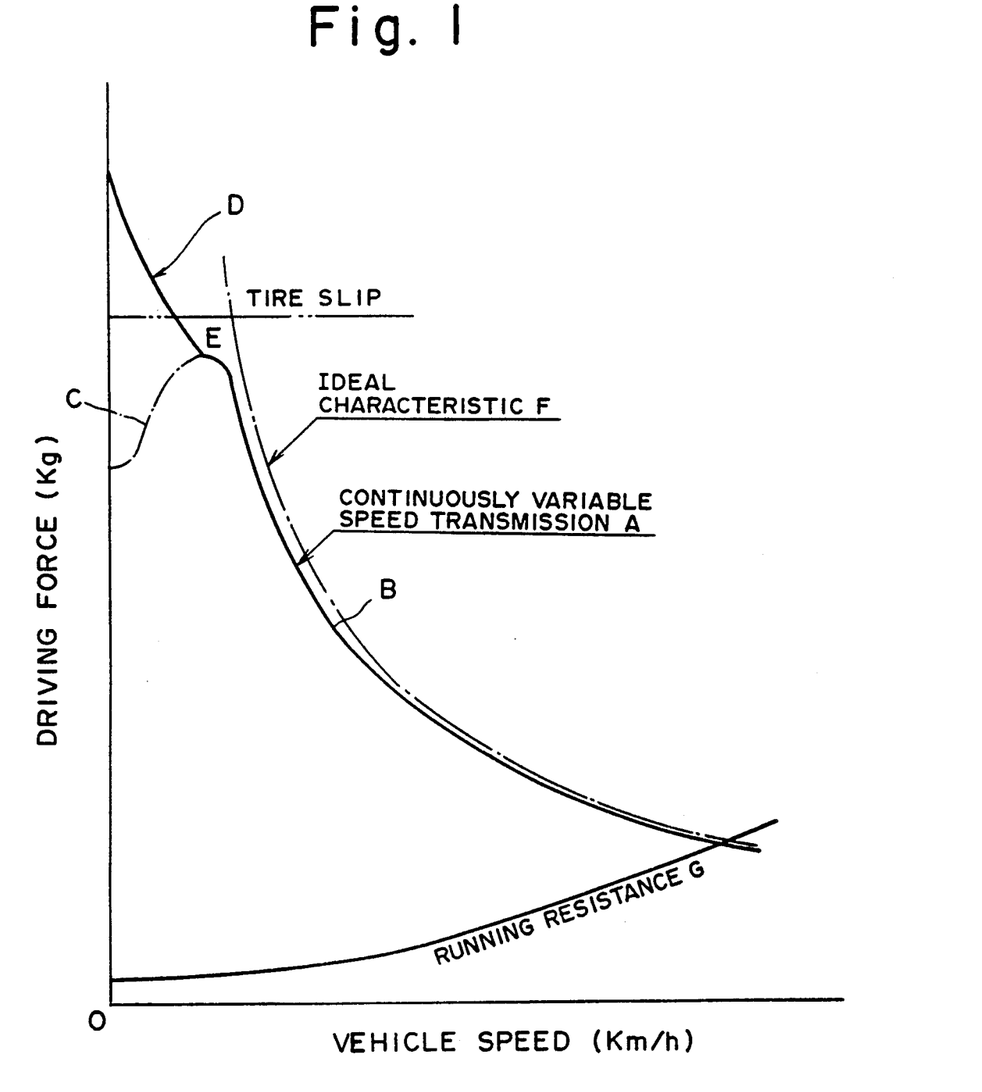
FIG. 1 is a diagram of the maximum driving force versus vehicle speed for a continuously variable speed transmission in accordance with the present invention.

In this arrangement, the torque from the engine is transmitted to the forward/reverse rotation changeover mechanism through the fluid torque converter and then to the primary pulley of the belt drive continuously variable speed transmission. In this operation, at the time of starting of the vehicle, the fluid torque converter is in the maximum stall state and the approximately doubled torque is input to the belt drive continuously variable speed transmission. The torque increasing effect of the fluid torque converter is thereafter gradually reduced until the fluid torque converter starts operating in the coupling range. The continuously variable speed transmission is thereby shifted in accordance with a curve close to the ideal characteristic curve F as shown in FIG. 1 during ordinary running, or is shifted by departing from the ideal characteristic F by reducing the driving force at the time of starting. At the time of vehicle starting, however, the torque of the fluid torque converter is gradually reduced from that corresponding to the maximum stall state so that the characteristic C is cancelled, and the transmission exhibits, on the whole, the maximum driving force at the time of vehicle starting, as represented by the characteristic D. The fluid torque converter starts operating in the coupling range at the point E and thereafter changes the torque as represented by the characteristic B close to the ideal characteristic F on the basis of the belt drive continuously variable speed transmission during the ordinary running.

The belt drive continuously variable speed transmission produces an axial force corresponding to the transmitted torque by the effect of the pressure adjusting cam mechanism to clamp the belt, thereby transmitting power on the basis of this force without any belt slip. In particular, at the time of vehicle starting, the torque of the fluid torque converter is increased and the pressure adjusting cam mechanism automatically produces a large axial force corresponding to the increase in torque to clamp the belt with an increased clamping force and to thereby transmit power while preventing occurrence of slip. Thus, a large belt clamping force is produced for a short period of time at the time of vehicle starting. When the fluid torque converter starts operating in the coupling range by gradually reducing the torque, the axial force produced by the pressure adjusting cam mechanism is automatically reduced. Thus, the belt is clamped by a reduced axial force for a greater part of the operating time.

DESCRIPTION OF THE PREFERRED EMBODIMENT

An embodiment of the present invention in which the invention is applied to a continuously variable speed automatic transmission for vehicles will be described below with reference to the accompanying drawings.

Figure 2:
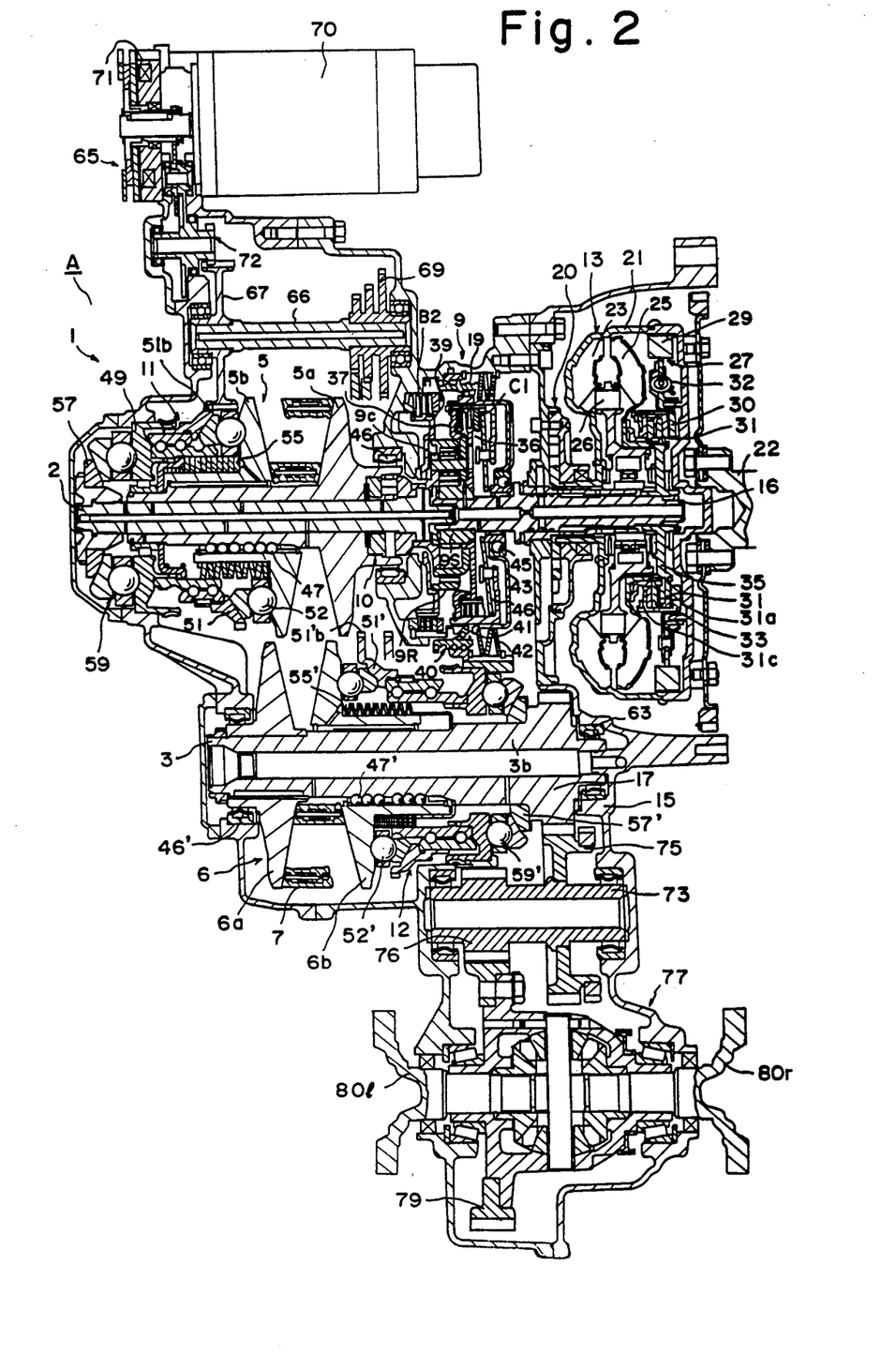
FIG. 2 is a cross-sectional view of the whole of the continuously variable speed transmission in accordance with the present invention.

Referring to FIG. 2, a continuously variable speed transmission A has a three-section transmission case 15 in which an output shaft 16 of a fluid torque converter 13 and a primary shaft 2 of a belt drive continuously variable speed transmission 1 are coaxially and rotatably supported and together constitute a first shaft. A secondary shaft 3 of the belt drive continuously variable speed transmission 1 on which an output gear 17 is integrally formed is also rotatably supported in the case 15 and constitutes a second shaft. A dual planetary gear mechanism 9 constituting a forward/reverse rotation changeover mechanism, an operating device 19 for operating the forward/reverse rotation changeover mechanism and a hydraulic pump 20 are disposed on the first shaft between the fluid torque converter 13 and the primary pulley 5.

The fluid torque converter 13 has a converter housing 21 to which an engine crank shaft 22 is connected and in which an pump impeller 23 is provided. A turbine runner 25 is disposed so as to face the pump impeller 23, and a stator 26 inhibited from rotating in one direction is disposed between the pump impeller 23 and the turbine runner 25. A lock-up clutch 27 is disposed in the converter housing 21 in parallel with the turbine runner 25. The clutch 27 has a centrifugal friction clutch 29, a slip clutch 30, a pressure adjusting cam mechanism 31 and a damper spring 32. The slip clutch 30 is interposed between a clutch drum 33 linked with the centrifugal friction clutch 29 through a damper spring 32 and a clutch hub 35 connected to the output shaft 16. An input-side cam 31a of the pressure adjusting mechanism 31 is connected to the turbine runner 25 while an output-side cam 31b is connected to the clutch hub 35, and a disc spring 31c is provided to apply a predetermined press-contact force. The pressure adjusting cam mechanism 31 thereby produces an axial force corresponding to the load torque acting on the output shaft 16 and applies this axial force to the slip clutch 30, thereby increasing the torque capacity of the slip clutch 30 for the increase in the load torque.

A sun gear 9S of the dual planetary gear mechanism 9 constituting the forward/reverse rotation changeover mechanism is spline-connected to an extreme end portion of the output shaft 16 of the fluid torque converter 13, and a flange 36 extends outward in the radial direction from this portion. The primary shaft 2 of the belt drive continuously variable speed transmission 1 is fitted to the extreme end of the output shaft 16 while being aligned with the same, with a bush interposed therebetween. A carrier 9C of the dual planetary gear mechanism 9 is spline-connected to the shaft 2. A first and second pinions are supported on the carrier 9C, and a connection member 37 extends outward in the radial direction from the carrier 9C. A forward clutch C1 consisting of a multi-plate clutch is interposed between an inner-circle portion of the connection member 37 and an outer-circle portion of the flange 36 of the output shaft 16. A reverse brake B2 consisting of a multi-plate brake is interposed between the case 15 and an outer peripheral portion of a support member 39 fixed to a ring gear 9R of the dual planetary gear mechanism 9.

The operating device 19 of the forward/reverse rotation changeover mechanism has a ball screw mechanism 40 disposed outside the reverse brake B2 and the forward clutch C1 in the radial direction. An female screw part of the ball screw mechanism 40 is supported on the case 15 while being inhibited from moving in the axial direction and from rotating. An electric motor (not shown) such as a commutator motor, a step motor or an ultrasonic motor is disposed on the case 15. This electric motor has a retaining means such as an electromagnetic brake and has its output gear connected to a male screw part of the ball screw mechanism 40 through a reduction device (not shown). The male screw part is moved in the axial direction by being rotated by the electric motor. A brake operating member 41 is connected to an inside portion of the male screw part with a ball bearing interposed therebetween. The brake operating member 41 extends in the axial direction parallel with the male screw part and is capable of operating the reverse brake B2 by the movement of the male screw part in one direction. A clutch operating member 43 is provided which has an outer peripheral flange portion contacting one end of a return spring 42 consisting of a multiplicity of disc springs and fixed at the other end to the case 15, and an inner peripheral portion supported on the output shaft 16 with a ball bearing 45 interposed therebetween. The operating member 43 can be moved integrally with the brake operating member 41 by being brought into contact with the same by the movement of the male screw part in the other direction. A clutch pressing plate 46 formed of a disc spring contacts the ball bearing 45. The clutch pressing plate 46 is swingably supported at its central portion so as to press, in a home position, the forward clutch Cl to maintain the same in a connected state. The return spring 42, which may be formed of a coil spring instead of disc springs, has a strong urging force against the pressing plate 46. Consequently, when no torque is applied to the ball screw mechanism 40 (that is, before the engine is started), the forward clutch Cl is maintained in a disengaged state based on the effect of the return spring 42, and the reverse brake B2 is also maintained in a disengaged state.

Figure 3:
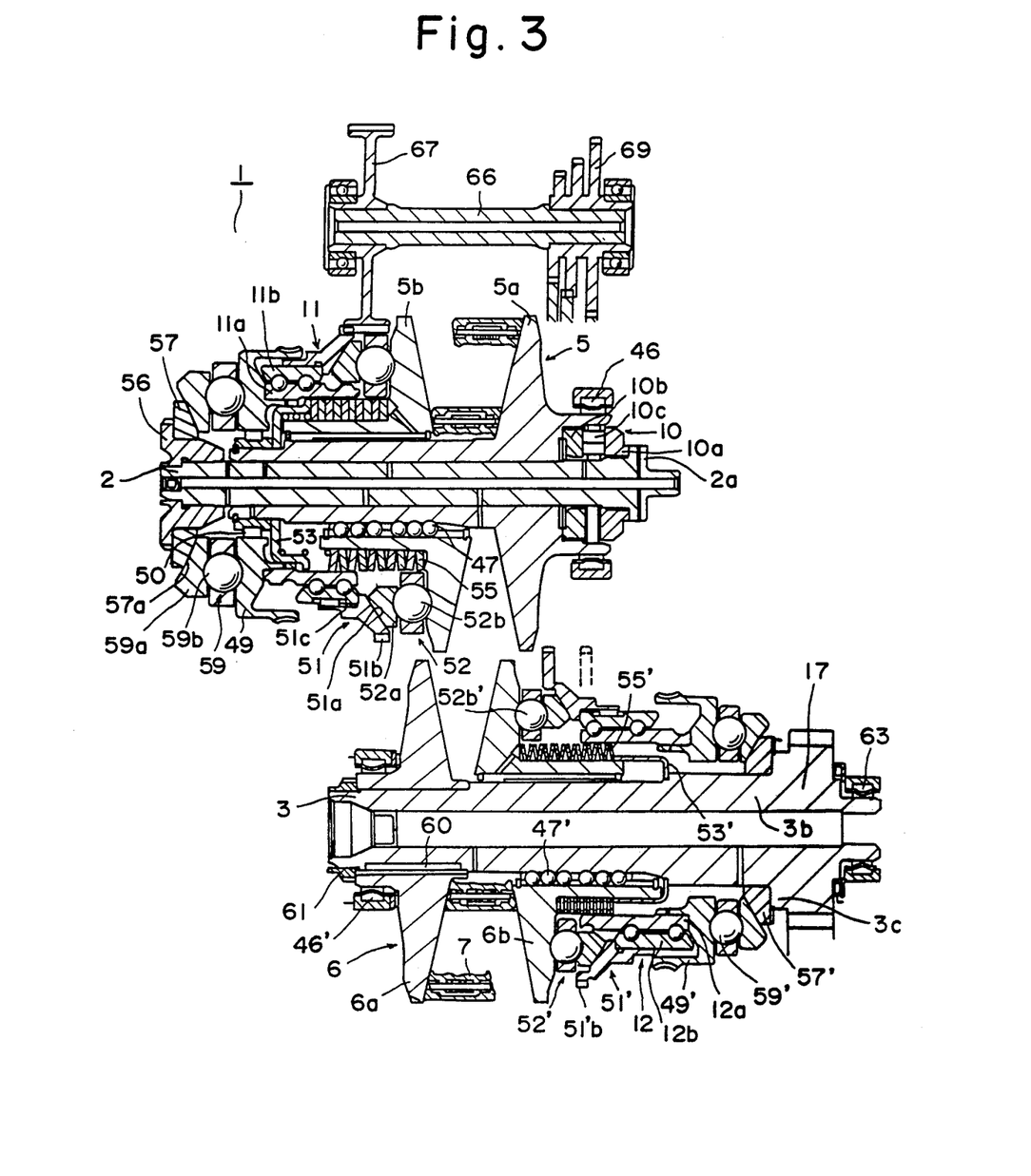
FIG. 3 is a cross-sectional view of the belt drive continuously variable speed transmission shown in FIG. 2.

As illustrated in FIG. 3 in detail, the belt drive continuously variable speed transmission 1 comprises a primary pulley 5, a secondary pulley 6 and a belt 7 wrapped around the pulleys 5 and 6. The pulleys 5 and 6 comprise a fixed sheaves 5a and 6a and movable sheaves 5b and 6b. The belt 7 has a multiplicity of metallic pieces which contact the pulleys 5 and 6 in a lubricated state to transmit the torque. Accordingly, the friction between the metallic pieces and the pulleys 5 and 6 is comparatively small, and the angle of the contact surfaces of the belt pieces and the pulley 5 or 6 is set to an angle larger than the static frictional angle. That is, the belt 7 can be moved in the radial direction by the movement of the pulleys 5 and 6 in the axial direction. The fixed sheave 5a of the primary pulley 5 is rotatably supported by a roller bearing 46 on the case 15, and a base end portion of the primary shaft 2 is bulged outward in the radial direction to form a flange 2a. A pressure adjusting cam mechanism 10 is provided between the flange 2a and a back portion of the fixed sheave 5a. The pressure adjusting cam mechanism 10 comprises a fixed side cam part 10a spline-connected to the primary shaft 2 and inhibited by the flange 2a from moving in the axial direction, a movable side cam part 10b spline-connected to the fixed sheave 5a and contacting the same under pressure with a disc spring interposed therebetween, and a roller bearing 10c interposed between the two cam parts 10a and 10b, thereby applying the axial force corresponding to the transmitted torque to the stationary sheave 5a. A boss portion of the fixed sheave 5a extends toward the movable sheave 5b and its inner peripheral surface is fitted around the primary shaft 2, while on its outer peripheral surface is supported a boss portion of the movable sheave 5b so as to be movable in the axial direction alone, with a multi-row ball spline mechanism (linear ball bearing) 47 interposed therebetween. That is, the movable sheave 5b is fitted around the boss portion of the fixed sheave 5a while contacting the same through balls alone and is therefore free from slide frictional resistance to sliding.

A ball screw mechanism 11 is disposed on the back side of the movable sheave 5b. The ball screw mechanism 11 comprises a male screw part 11a, a female screw part 11b and balls made to circulate through return paths. The ball screw mechanism 11 is based on a single screw, and recessed grooves of two or more leads are formed in the female screw part 11b. The male screw part 11a is longer than the female screw part 11b in the axial direction, and a rear end portion of the male screw part 11a is fixed to an adjustable intermediate member 49 supported on a shoulder portion of the case 15 while being restrained in the axial and radial directions. The primary shaft 2 is rotatably supported on the adjustable intermediate member 49 by means of a roller bearing 50, with an inner cylindrical portion of the boss portion of the fixed sheave 5a facing the bearing. The adjustable intermediate member 49 meshes with a worm (not shown) and is rotated based on the operation of this worm to rotate the male screw part 11a relative to the female screw part 11b, thereby enabling the initial tension and the running center of the belt 7 to be adjusted. An automatic aligning mechanism 51 is fixed to the female screw part 11b, and a thrust ball bearing 52 is interposed between the automatic aligning mechanism 51 and the backside of the movable sheave 5b. The thrust ball bearing 52 has a multiplicity of balls 52b held in a cage. The balls 52b directly abut, on one side, against recesses formed in the backside of the movable sheave 5b and, on the opposite side, against a race 52a. The race 52a has a spherical convex surface which is formed on its opposite side and which is in tight contact with a spherical supporting surface 51a of the automatic aligning mechanism 51. The spherical supporting surface 51a has a concave surface obliquely facing downward and having a focus located at the center of the primary shaft 2. The automatic aligning mechanism 51 also has a projecting portion which extends obliquely along the spherical supporting surface 51a, a circular gear portion 51b formed at the distal end of the projecting portion, and a fixing portion 51c fixed to the female screw part 11b so as to be rotatable integrally with the female screw part 11b.

Between the backside of the movable sheave 5b and a support plate 53 which is prevented from moving in the axial direction by the inner race of the roller bearing 50 held by the adjustable intermediate member 49, an elastic urging member 55 is provided which consists of a predetermined number of disc springs and which carries part of the belt clamping load so as to reduce the load to be carried by the ball screw mechanism 11 and the thrust ball bearing 52. A flange 56 is fixedly screwed to a fore end portion of the primary shaft 2 and another automatic aligning mechanism 57 is fixed to the flange 56. The automatic aligning mechanism 57 is based on a convex surface directed obliquely outward and has a spherical supporting surface 57a which has a focus located on an extension of the center line of the primary shaft 2. Between the automatic aligning mechanism 57 and the backside of the adjustable intermediate member 49 is interposed a thrust ball bearing 59 which has a multiplicity of balls 59b held in a cage, and a race 59a positioned on one side of the balls 59b. The balls 59b directly abut against recesses formed in the backside of the adjustable intermediate member 49, and the race 59a abutting against external end surfaces of the balls 59b has a spherical concave surface which is in tight contact with the spherical supporting surface of the automatic aligning mechanism 57.

On the other hand, the fixed sheave 6a of the secondary pulley 6 is supported on the case 15 by a roller bearing 46' so as to be rotatable integrally with the secondary shaft 3. A base end portion of the shaft 3 with which the output gear 17 is formed integrally is supported on the case 15 by a roller bearing 63. A boss portion of the movable sheave 6b is slidably fitted to the secondary shaft 3 with only balls of a ball spline 47' similar to the above-described ball spline 47 interposed therebetween. A ball screw mechanism 12 similar to the above-described one is arranged on the backside of the movable sheave 6b. A female screw portion 12a of the ball screw mechanism 12 is fixed to an adjustable intermediate member 49' similar to the adjustable intermediate member 49. Thus, the adjustable intermediate member 49' serves, in association with the adjustable intermediate member 49 on the side of the primary shaft, to adjust the initial tension and the running center line of the belt 7 on the basis of the rotation of the worm. As on the primary shaft, an automatic aligning mechanism 51' is fixed to a female screw part 12b, and a thrust ball bearing 52' is interposed between the automatic aligning mechanism 51' and the backside of the movable sheave 6b. Further elastic urging member 55' similar to that provided on the side of the primary shaft is disposed between the backside of the movable sheave 6b and a supporting plate 53' fixed to the secondary shaft 3.

The secondary shaft 3 has at its base end a larger diameter which defines a large-diameter shaft portion 3b which extends outward in the radial direction at the base end of the shaft to form the output gear 17. The fixed sheave 6a is fitted to a fore end portion of the secondary shaft 3 with a key 60 interposed therebetween, and a nut 61 is screwed into this portion to prevent the fixed sheave 6a from being dismounted. As on the side of the primary shaft, an automatic aligning mechanism 57' having a convex spherical supporting surface with a focus located on an extension of the center line of the shaft 3 is fixed to a side surface 3c of the output gear 17. Between the automatic aligning mechanism 57' and the backside of the adjustable intermediate member 49' is interposed a thrust ball bearing 59' which has balls directly abutting against the backside of the adjustable intermediate member 49', and a race having a spherical concave surface which is in tight contact with the spherical supporting surface.

Figure 4:
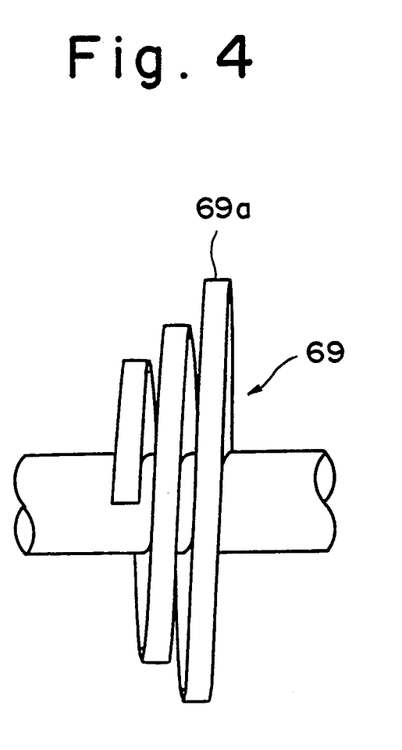
FIG. 4 is a front view of a spiral non-circular gear of the transmission shown in FIG. 3.

As illustrated in FIGS. 2 and 3, a belt operating device 65 is provided where a triangle is formed by the primary and secondary shafts 2 and 3. The operating device 65 has one counter shaft 66 supported by a bearing on the case 15. A wide circular gear 67 is fixed to the shaft 66 at one end thereof while a non-circular gear 69 is fixed to the other end. The non-circular gear 69 has a spiral teeth portion 69a as shown in FIG. 4 and continuously meshes with another non-circular spiral gear 51'b fixed to the female screw part 12b of the ball screw mechanism 12 on the secondary side to transmit one or more revolutions. The wide circular gear 67 meshes with a circular gear 51b having a thin toothed portion and fixed to the female screw part 11b of the ball screw mechanism 11 on the primary side and can always maintain the meshed relationship irrespective of the axial movement of the female screw part 11b. An electric motor 70 similar to the above-described motor for the forward/reverse rotation changeover mechanism is disposed outside the case 15. The electric motor 70 is maintained in a predetermined rotational position by an electromagnetic brake 71, and an output gear of the electric motor 70 is linked with the wide circular gear 67 through a reduction device 72 constituted by a spur gear or a helical gear.

The output gear 17 formed on the secondary shaft 3 meshes with a large gear 75 fixed to an intermediate shaft 73. A small gear 76 is also formed on the intermediate shaft 73 to mesh with a ring gear 79 fixed to a differential gear mechanism 77, thereby constituting a reduction mechanism. Left and right front axles 80l and 80r extend from the differential gear mechanism 77.

The operation of the present invention will be described below.

The torque of the engine crank shaft 22 is transmitted to the output shaft 16 through the fluid torque converter 13 at the time of vehicle starting. That is, the torque of the engine crank shaft 22 is transmitted from the pump impeller 23 to the turbine runner 25 through the medium of oil flow and is increased at the stator 26. During this operation, a maximum stall condition is reached while the vehicle is in the stopped state, and the torque approximately doubled is transmitted to the output shaft 16. As the ratio of the relative speeds of the pump impeller 23 and the turbine rubber 25 decreases after the vehicle has been started, the torque transmitted to the output shaft 16 is gradually reduced.

The increased torque of the output shaft 16 is transmitted to the pressure adjusting cam mechanism 10 of the belt drive continuously variable speed transmission 1 via the forward/reverse rotation changeover mechanism, and a strong axial force corresponding to the increased torque is applied to the fixed sheave 5a of the primary pulley 5 by the cam mechanism 10.

When the vehicle speed is increased so that the fluid torque converter 13 starts operating in the coupling range, the torque output to the output shaft 16 becomes generally equal to that of the engine crank shaft 22 and is also transmitted to the pressure adjusting cam mechanism 10 so that this mechanism outputs a comparatively small axial force corresponding to this torque.

When the speed of the output shaft 16 of the fluid torque converter 13 becomes equal to a predetermined speed, the lock-up clutch 27 is connected and the torque is thereafter transmitted by the mechanical connection of the lock-up clutch 27. That is, when the centrifugal friction clutch 29 engages with the converter housing 21 by the effect of the centrifugal force, the torque from the engine crank shaft 22 is transmitted to the output shaft 16 through the centrifugal friction clutch 29, the damper spring 32, the slip clutch 30 and the clutch hub 35. If at this time a large load is applied by kick-down, hard braking, up-shifting or the like or if vibrations occur on the input side by knocking or the like, the slip clutch 30 slips and absorbs such a load or vibrations, thereby enabling the torque to be smoothly transmitted. In a case where the load changes greatly while the pressure adjusting cam mechanism 31 is applying an axial force corresponding to the load to the slip clutch 30, this change in the load is temporarily absorbed by the fluid torque converter 13, and the pressure adjusting cam mechanism 31 thereafter immediately increases the torque capacity of the slip clutch 30 to transmit the torque through the mechanical connection.

In the forward/reverse rotation changeover mechanism, where the engine is not started, the return spring 42 prevails the pressing plate 46 to maintain the forward clutch C1 in the disconnected state, and the reverse brake B2 is not actuated in the neutral state, thereby preventing the vehicle from immediately starting running even if the engine is started in a case where the electrical system malfunctions. If the electric motor is rotated in one direction to move the male screw part of the ball screw mechanism 40 against the return spring 42, the clutch operating member 43 is moved to the right as viewed in the figures and to thereby bring the pressing plate 46 closer to the home position, thereby making the pressing plate 46 engage with the forward clutch C1. In this state, the torque of the output shaft 16 of the fluid torque converter 13 is transmitted to the sun gear 9S and to the carrier 9C through the forward clutch C1, thereby integrally rotating the dual planetary gear mechanism 9. The torque thereof is transmitted to the primary shaft 2. If the electric motor is rotated in the other direction to move the ball screw mechanism 40 in the other direction, the reverse brake B2 is engaged by the brake operating member 41. In this state, the ring gear 9R is fixed and the torque of the sun gear transmitted from the output shaft 16 is extracted as a reverse torque at the carrier 9C. This reverse torque is transmitted to the primary shaft 2.

The torque of the primary shaft 2 is transmitted to the fixed side cam part 10a of the pressure adjusting cam mechanism 10 in the belt drive continuously variable speed transmission 1 and is further transmitted to the movable sheave 5b of the primary pulley 5 through the roller bearing 10c and the movable side cam part 10b, and an axial force corresponding to the transmitted torque is applied to the fixed sheave 5a, thereby transmitting the axial force corresponding to the transmitted torque to all the relating portions of the belt drive continuously variable speed transmission 1 through the belt 7. The torque of the fixed sheave 5a is transmitted to the movable sheave 5b through the ball spline mechanism 47 to clamp the belt 7 by an axial force based on the pressure adjusting cam mechanism 10, and is transmitted to the secondary pulley 6 through the belt 7. At this time, the axial reaction of the belt 7 acts on the fixed sheave 5a and the movable sheave 5b, but the axial force from the fixed sheave 5a is received by the flange 2a of the primary shaft 2 through the pressure adjusting cam mechanism 10. The axial force from the movable sheave 5b is received by the flange 56 fixed to the primary shaft 2 through the thrust ball bearing 52, the automatic aligning mechanism 51, the ball screw mechanism 11 in a predetermined condition, the adjustable intermediate member 49, the thrust ball bearing 59 and the automatic aligning mechanism 57. Thus, the axial forces are received by a close loop in which they act as a tensile force of the primary shaft 2. A part of the axial force acting on the movable sheave 5b is directly applied from the backside of the sheave to the primary shaft 2 through the elastic urging member 55 and the supporting plate 53, thereby reducing the axial force acting on the thrust ball bearings 52 and 59 and the ball screw mechanism 11.

The torque from the belt 7 is transmitted to the secondary pulley 6 and then to the secondary shaft 3 through the key 60 and the ball spline 47'. At this time, as on the side of the primary shaft, the axial reaction acting on the fixed sheave 6a of the secondary side is also directly received by the secondary shaft 3 with the nut 61, while the axial reaction acting on the movable sheave 6b is received by the output gear 17 formed on the secondary shaft 3 through the thrust ball bearing 52', the ball screw mechanisms 12, the adjustable intermediate member 49' and the thrust ball bearing 59'. Also, a part of the axial force acting on the movable sheave 6b is directly received by the secondary shaft 3 through the elastic urging member 55' and the supporting plate 53'.

At this time, even if a deviation of the movable sheave 5b or 6b on the primary or secondary side takes place, the thrust ball bearing 52 or 52' is automatically aligned by the automatic aligning mechanism 51 or 51', so that the balls 52b or 52b' are automatically controlled so as to uniformly abut against the backside of the movable sheave 5b or 6b over the whole periphery thereof. Similarly, even if a deviation of the primary or secondary shaft 2 or 3 takes place relative to the adjustable intermediate member 49 or 49' supported on the shoulder portion of the case, the balls 59 or 59' are automatically controlled so as to uniformly abut against the backside of the adjustable intermediate member 49 or 49' over the whole periphery thereof by the automatically aligning effect of the automatic aligning mechanism 57 or 57'.

If the electric motor 70 is rotated on the basis of a speed change command from the control section, the wide circular gear 67 is rotated in the predetermined direction and the non-circular spiral gear 69 is thereby rotated through the counter shaft 66. The circular gear 67 rotates the female screw part 11b by meshing with the circular gear 51b fixed to the female screw part 11b of the ball screw mechanism 11 on the primary side. The female screw part 11b is moved in the axial direction relative to the male screw part 11a inhibited by the adjustable intermediate member 49 from rotating, to move the movable sheave 5b through the thrust ball bearing 52, thereby changing the effective diameter of the belt portion wrapping round the primary pulley 5. The non-circular gear 69 rotates while meshing with the non-circular gear 51'b fixed to the female screw part 12b of the ball screw mechanism on the secondary side to rotate the female screw part 12b relative to the fixed male screw part 12a. The female screw part 12b is thereby moved in the axial direction to move the movable sheave 6b through the thrust ball bearing 52', thereby changing the effective diameter of the belt portion wrapped around the secondary pulley 6. At this time, the extents of movement of the primary and secondary pulleys 5 and 6 do not linearly correspond with respect to the extent of movement of the belt 7, but the difference therebetween is suitably absorbed by the transmission through the non-circular gears 69 and 51'b. By the effect of the spiral shapes of the non-circular gears 69 and 51'b, these gears can continuously mesh with each other while rotating a plurality of times with the axial movement of the female screw part 12b, thereby enabling the ball screw mechanisms 11 and 12 to have predetermined strokes with predetermined leads.

As the electric motor 70 is rotated in direction of, for example, up-shifting of the belt drive continuously variable speed transmission 1, the female screw part 11b of the ball screw mechanism 11 on the primary side is extended while the female screw part 12b of the ball screw mechanism 12 on the secondary side is contracted. The movable sheave 5b on the primary side is thereby moved together with the female screw part 11b in the pulley diameter increasing direction (rightward in the axial direction as viewed in the figures). At this time, the boss portion of the movable sheave 5b is moved in the axial direction without any frictional sliding action by the effect of the ball spline 47. Also, as the female screw part 12b is moved, the movable sheave 6b on the secondary side is moved in the pulley diameter reducing direction (rightward in the axial direction as viewed in the figures) by the force applied from the belt 7 based on the pressure adjusting cam mechanism 10. In this case also, as on the primary side, the boss portion of the movable sheave 6b is moved in the axial direction without any frictional sliding action by the effect of the ball spline 47'.

The ball screw mechanisms 11 and 12 on the primary and secondary sides are constituted by the reversible transmission mechanisms capable of converting torques into axial forces as well as converting axial forces into torques. Moreover, the female screw parts 11b and 12b of the ball screw mechanisms 11 and 12 are moved in the linked relationship by the reversible transmission mechanism constituted by a spur gear or a helical gear, thereby enabling the axial force applied from the belt 7 to the secondary pulley 6 to be transmitted and converted into an axial force of the primary pulley 5 through the reversible transmission mechanism. Substantially no axial movement resistance is therefore exhibited with respect to the axial force applied from the ball screw mechanism on the primary side to the movable sheave 5b at the time of speed changing, and this axial force may be, at most, as large as the difference between the clamping forces applied from the primary and secondary pulleys 5 and 6 to the belt 7. An electric motor having a small torque capacity may therefore suffice for use as the electric motor 70, and it is possible to perform the shifting operation at a high speed. Also, the pressure adjusting cam mechanism 10 is not required to have a force for the movable sheave 5b movement resistance and may be designed for generating only a comparatively small axial force. When the electric motor 70 is rotated in the down-shifting direction, the ball screw mechanism 12 on the secondary side is extended and the ball screw mechanism 11 on the primary side is contracted, thereby performing a similar shifting operation.

In a case where the vehicle is stopped by hard braking during running at a high speed, i.e., during a speed increased state of the belt drive continuously variable speed transmission 1, there is a possibility of failure to return the belt drive continuously variable speed transmission 1 to the lowermost speed state. The arrangement of the present invention is also effective in such a situation. That is, as described above, the ball screw mechanisms 11 and 12 have comparatively small lead angles, there are no sliding frictional resistances of the movable sheaves 5b and 6b, and the static frictional angle of the belt 7 and the pulley 5 or 6 is smaller than the contact angle, thereby allowing the axial movements of the movable sheaves 5b and 6b. The same can be said with respect to the stopped state of the belt drive continuously variable speed transmission 1. It is therefore possible to continue rotating the electric motor 70 to move the movable sheaves 5b and 6b in the axial direction and to thereby return the belt drive continuously variable speed transmission 1 to the lowermost speed state even after the vehicle has been stopped.

The torque of the primary shaft 2 is transmitted from the output gear 17 to the ring gear 79 of the differential gear mechanism 77 through the large gear 75 and the small gear 76 and then to the left and right front axles 80l and 80r by the differential gear mechanism 77.

In accordance with the present invention, as described above, the fluid torque converter 13 is disposed on the transmission upstream side of the belt drive continuously variable speed transmission 1 to ensure that even though the driving force of the belt drive continuously variable speed transmission 1 is reduced in a low speed condition, the torque is increased to cancel the reduction in the driving force on the basis of the characteristics of the fluid torque converter 13 which reside in that the output torque is gradually reduced from the maximum stall state corresponding to the state in which the vehicle is stopped, thereby obtaining a large torque necessary for starting the vehicle. During normal running, the fluid torque converter 13 operates in the coupling range to change the torque in accordance with the characteristic curve B nearly equal to the ideal characteristic curve F, thereby ensuring improved drivability during normal running as well as obtaining a large driving force at the time of starting and improved acceleration performance.

It is also possible to obtain a sufficiently large torque ratio width by the combination of the fluid torque converter 13 and the belt drive continuously variable speed transmission 1 and, hence, to perform shifting by the operation of the belt drive continuously variable speed transmission 1 alone without necessitating any auxiliary transmission means such as a low-high speed mode changeover mechanism. It is thereby possible to simplify the construction of the continuously variable speed transmission A, to also simplify the controller and, hence, to reduce the overall size of the transmission.

Even though a large torque is transmitted from the fluid torque converter 13 to the belt drive continuously variable speed transmission 1 at the time of vehicle starting, the power can be positively transmitted without belt slippage because an axial force corresponding to the transmitted torque is applied from the pressure adjusting cam mechanism 10 to the belt drive continuously variable speed transmission 1. In particular, under every running condition except for those during a short period of time for vehicle starting, the fluid torque converter 13 does not increase the torque, and the pressure adjusting cam mechanism 10 produces a comparatively small axial force corresponding to the transmitted torque. There is therefore no risk of the belt being clamped excessively, and the transmission efficiency and the belt durability can be improved while a sufficient strength of the belt is maintained, thereby enabling the transmission to be improved in reliability as well as to be reduced in size.

The primary and secondary pulleys 5 and 6 of the belt drive continuously variable speed transmission 1 are operated by the ball screw mechanisms 11 and 12 without using any hydraulic actuator. Therefore there are no problems such as those of high pressure pumps and seals owing to hydraulic pressure. It is also possible to improve the response by directly controlling the ball screw mechanisms 11 and 12 with electrical signals from the control section.

Because the pressure adjusting cam mechanism 10 is provided between the fixed sheave 5a of the primary pulley 5 and the primary shaft 2, the torque transmitted from the fluid torque converter 13 is directly applied to the belt drive continuously variable speed transmission 1 at the uppermost transmission upstream position thereof, thereby rapidly applying the predetermined axial force throughout the whole of the belt drive continuously variable speed transmission 1. Because the forward/reverse rotation changeover mechanism is coaxially disposed between the fluid torque converter 13 and the primary pulley 5, the whole of the continuously variable speed transmission A can be rendered compact.

It is also possible to eliminate the need for hydraulic actuators for operating the forward/reverse rotation changeover mechanism by adopting the operating device 19 having the ball screw mechanism 40. This arrangement as well as the above-described arrangement for operating the continuously variable speed transmission A enables the construction of the controller to be simplified. This arrangement also ensures an improvement in the response as well as elimination of the problems such as oil leak of a hydraulic system.

The lock-up clutch 27 having the centrifugal friction clutch 29 is provided for the fluid torque converter 13. The lock-up clutch 27 requires no hydraulic changeover control. This operating means as well as those for the continuously variable speed transmission A and the forward/reverse rotation changeover mechanism enables the construction of the controller to be simplified. Although the transmitted torque capacity is increased with the increase in the rotational speed of the centrifugal friction clutch 29 by the effect of the slip clutch 30 inserted at the lock-up clutch 27, the slip clutch 30 slips if a large change in the load or input side vibrations are caused, and absorbs the change in the load or vibrations, thereby preventing stick slip as well as shift shock. Further the pressure adjusting mechanism 31 for applying the axial force corresponding to the load torque to the slip clutch 30 is inserted to set the torque capacity of the slip clutch 30 according to the load torque. If the slip clutch 30 slips, the fluid torque converter 13 temporarily absorbs the change in the load, and the torque capacity of the slip clutch 30 is thereby increased automatically, thereby transmitting power corresponding to the large torque. Thus, the fluid loss of the fluid torque converter can be reduced for improvement in the transmission efficiency.

The present invention is not limited to the above-described embodiment and can be modified in various ways based on its gist without departing from the scope set forth in the appended claims.

What we claim is:

1. A continuously variable speed transmission for use in conjunction with a vehicle engine, said transmission comprising: a belt drive continuously variable speed transmission having two pulleys, said pulleys being supported, respectively, on first and second shafts and each pulley including a pair of fixed and movable sheaves, said moveable sheaves capable of moving axially relative to said fixed sheaves, a belt wrapped around said two pulleys; and a forward/reverse rotation changeover mechanism; said continuously variable speed transmission comprising:

(a) a fluid torque converter for transmitting torque from the engine to said belt drive continuously variable speed transmission, said fluid torque converter including an output shaft, a pump impeller, a turbine runner fixed to said output shaft and fluidically driven by said pump impeller and a stator located between said pump impeller and said turbine runner;

(b) a pressure adjusting cam mechanism, mounted on said first shaft between one sheave of one of said pulleys and a stop member provided on said first shaft, for receiving said torque transmitted by said fluid torque converter and for transmitting an axial force corresponding to said transmitted torque to said one sheave; and (c) a mechanical actuator mounted on each of said first and second shafts for axially moving said moveable sheaves of said pulleys.

2. A continuously variable speed transmission according to claim 1, wherein said one sheave is a fixed sheave and wherein said forward/reverse rotation changeover mechanism is disposed between said output shaft of said fluid torque converter and said first shaft so as to be coaxial with said output shaft and with said first shaft, whereby said torque transmitted by said torque converter is transferred from said output shaft to said first shaft through said forward/reverse rotation changeover mechanism.

3. A continuously variable speed transmission according to claim 1, wherein said mechanical actuator includes a ball screw mechanism.

4. A continuously variable speed transmission according to claim 3, wherein said ball screw mechanism includes a male screw part connected to a fixed member so as to be prevented from moving either rotationally or axially, and a female screw part capable of moving axially while engaging with said male screw part in a screwing manner with balls interposed therebetween, and further comprising a torque transmitting for connecting and simultaneously driving the two female screw parts for said two pulleys.

5. A continuously variable speed transmission according to claim 1, wherein said forward/reverse rotation changeover mechanism has a duel planetary gear, a reverse brake for fixing a ring gear of said planetary gear, and a forward clutch for connecting and disconnecting a sun gear and a carrier of said planetary gear, and the transmission includes an operating device for operating said reverse brake and said forward clutch, said operating device having an electric motor, a ball screw mechanism rotated by said electric motor to axially move a movable part, and connecting means for establishing engagement with one of said reverse brake and said forward clutch while releasing the other by a movement in one direction and for establishing engagement with the other of said reverse brake and said forward clutch while releasing said one of said reverse brake and said forward clutch by a movement in the other direction.

6. A continuously variable speed transmission according to claim 1, wherein said fluid torque converter has a fluid torque transmission line through said pump impeller, turbine runner and stator, and further comprising a lock-up clutch serving to provide a mechanical transmission line parallel to said fluid transmission line, and said lock-up clutch having a centrifugal clutch, a slip clutch, and a pressure adjusting cam mechanism for applying an axial force corresponding to the load torque to said slip clutch.

7. The continuously variable speed transmission of claim 1 wherein said stop member is a flange on said first shaft.

* * * * *